(12) United States Patent
Whitaker et al.

(10) Patent No.: US 9,764,839 B2
(45) Date of Patent: Sep. 19, 2017

(54) TETHERED UNMANNED AERIAL VEHICLE FIRE FIGHTING SYSTEM

(71) Applicants: Todd Michael Whitaker, Boulder, CO (US); Michael Corson, Boulder, CO (US)

(72) Inventors: Todd Michael Whitaker, Boulder, CO (US); Michael Corson, Boulder, CO (US)

( * ) Notice: Subject to any disclaimer, the term of this patent is extended or adjusted under 35 U.S.C. 154(b) by 0 days.

(21) Appl. No.: 14/824,509

(22) Filed: Aug. 12, 2015

(65) Prior Publication Data

US 2017/0043872 A1    Feb. 16, 2017

(51) Int. Cl.
  *B64D 1/18*    (2006.01)
  *B64C 39/02*    (2006.01)
  *B64F 3/02*    (2006.01)
  *B64C 27/00*    (2006.01)
  *A62C 3/02*    (2006.01)

(52) U.S. Cl.
  CPC .............. *B64D 1/18* (2013.01); *A62C 3/0242* (2013.01); *B64C 27/00* (2013.01); *B64C 39/022* (2013.01); *B64C 39/024* (2013.01); *B64F 3/02* (2013.01); *B64C 2201/027* (2013.01); *B64C 2201/042* (2013.01)

(58) Field of Classification Search
  CPC .......... B64D 1/16; B64D 1/18; A62C 3/0228; A62C 3/0242; B64C 39/022; B64C 39/024; B64C 27/00; B64C 2201/027; B64C 2201/042; B64F 3/02
  USPC .......................................................... 169/53
  See application file for complete search history.

(56) References Cited

U.S. PATENT DOCUMENTS 3,381,922 A * 5/1968 Laing ........................ B05B 3/18
                                                                                     239/171

* cited by examiner

*Primary Examiner* — Christopher Kim
(74) *Attorney, Agent, or Firm* — Parsons & Goltry; Robert A. Parsons; Michael W. Goltry

(57) ABSTRACT

A tethered unmanned aerial vehicle firefighting system includes a firefighting drone, a lifting drone and a tether line coupling the firefighting drone to a control station through the lifting drone. The control station includes a control unit for controlling the firefighting drone and the lifting drone, a fire retardant supply, a pump coupled to the fire retardant supply, and a power supply. The tether line includes a power line coupling the power source to and powering the firefighting drone and a fire retardant hose coupled between the pump and a nozzle carried by the firefighting drone. A lifting tower hold the tether from the control station at a height above ground level, and the lifting drone maintains the tether above obstruction for the firefighter drone. The firefighter drone disperses fire retardant from the nozzle for firefighting purposes and with a substantially unlimited supply of retardant and power.

14 Claims, 5 Drawing Sheets

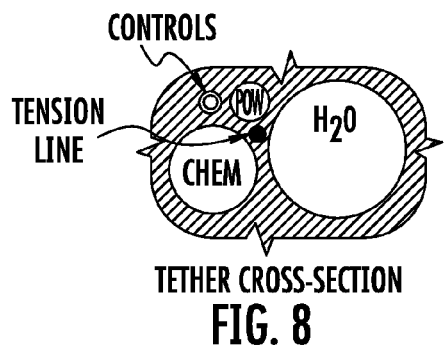
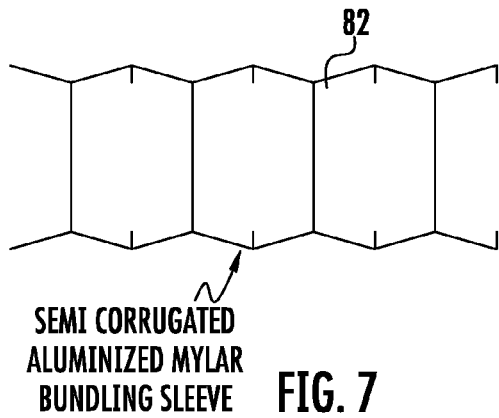
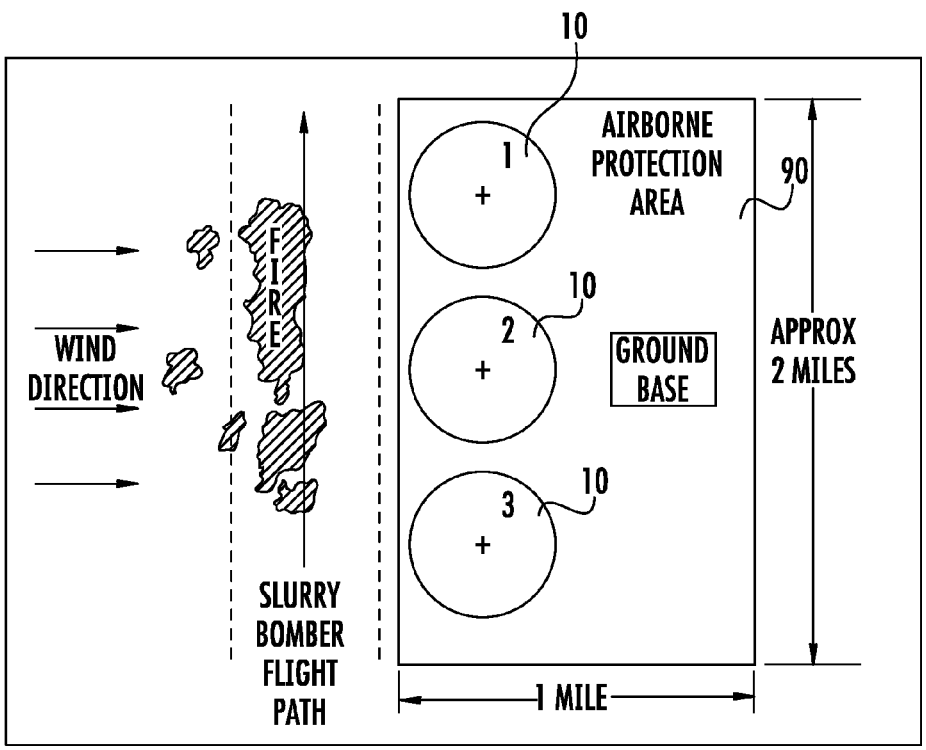

TETHERED UNMANNED AERIAL VEHICLE FIRE FIGHTING SYSTEM

CROSS-REFERENCE TO RELATED APPLICATION

This application claims the benefit of U.S. Provisional Patent Application No. 62/022,010, filed 8 Jul. 2014.

FIELD OF THE INVENTION

This invention relates to fire fighting equipment.
More particularly, the present invention relates to mobile aerial fire fighting equipment.

BACKGROUND OF THE INVENTION

In the field of firefighting, wilderness firefighting tactics can be broken down into two main groups; fire aviation and ground crews. Ground crews are effective at structure protection and creating fire lines, but have limited effect on fully developed, quick moving fires. Another consideration is that ground crews face a strenuous and dangerous task. Wildfires can quickly change direction and speed, subjecting ground crews to the extreme dangers of being cut-off or overrun. Fire aviation, consisting primarily of slurry bombers and heli-tankers, is extremely effective at suppressing fully developed fires over large and difficult to access areas. However, the equipment employed is expensive, difficult and costly to maintain, and has limited effect at night or under adverse weather conditions.

It would be highly advantageous, therefore, to remedy the foregoing and other deficiencies inherent in the prior art.

An object of the present invention is to provide an unmanned aerial firefighting system.

Another object of the present invention is to provide a firefighting system which will be effective at fire suppression while increasing safety and lowering costs.

Yet another object of the present invention is to provide an aerial firefighting system which will be effective at night and under adverse conditions.

SUMMARY OF THE INVENTION

Briefly, to achieve the desired objects and advantages of the instant invention, provided is a tethered unmanned aerial vehicle firefighting system. The system includes a firefighting drone having at least one drive motor and a nozzle, a control station including a control unit for controlling the firefighting drone, a fire retardant supply, a pump coupled to the fire retardant supply and a power supply, and a tether line coupled between the control station and the firefighting drone, the tether line including a power line coupling the power source to and powering the at least one drive motor of the firefighting drone, and a fire retardant hose coupled between the pump and the nozzle for supplying fire retardant to the nozzle carried by the firefighting drone under pressure.

In a specific aspect, the control station is carried by a tanker helicopter or can be carried by ground based vehicles.

The full tethered unmanned aerial vehicle firefighting system includes a firefighting drone, a control station, a tether line, a lift drone having at least one drive motor and a tether line support assembly, and a lifting tower. The tether line support assembly movably engages the tether line intermediate the control station and the firefighting drone to support the tether line above ground level and above obstructions. A power line couples the power source to and powering the at least one drive motor of the lifting drone. The lifting tower is positioned at or near the control station to support the tether line above obstructions proximate the control station. The lifting tower is an erectable tower, movable between a retracted position to facilitate storage and an extended position in which an upper end can be raised upwardly to support the tether line an initial distance above ground level.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 7 is a partial perspective view of the tether line of the firefighting system of the present invention;

FIG. 8 is a cross sectional view of the tether line of the firefighting system of the present invention;

FIG. 9 is a simplified schematic of systems of the present invention in use.

DETAILED DESCRIPTION OF THE PREFERRED EMBODIMENTS

Figure 1:
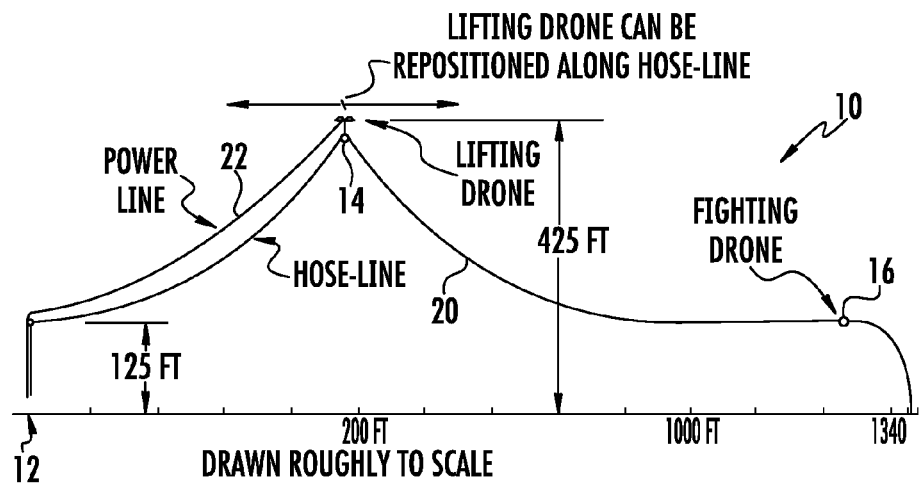
FIG. 1 is a simplified side view of a tethered unmanned aerial vehicle firefighting system according to the present invention.

Turning now to the drawings in which like reference characters indicate corresponding elements throughout the several views, attention is first directed to FIG. 1 which illustrate a tethered unmanned aerial vehicle firefighting system generally designated 10. System 10 includes a control station 12 and two unmanned aerial vehicles (UAVs), also referred to as drones, a lifting drone 14 and a firefighting drone 16. Firefighting drone 16 is powered through a tether line 20 coupled between control station 12 and drone 16. Lifting drone 14 supports tether line 20 and is preferably adjustably movable along the length thereof, for purposes which will be described presently. While preferably movable along the length of tether line 20, lifting drone can potentially be fixed in position. In this instance, power for lifting drone 14 can be provided by Tether line 20. However, in the preferred embodiment, a separate power line 22 is coupled between lifting drone 14 and control station 12, allowing movement of lifting drone 14 along the length of tether line 20. By employing lift drone 14, firefighting drone 16 can be positioned at a substantial distance from control station 12, for example giving firefighting drone 16 a range of approximately one quarter mile. Without lifting drone 14, tether line 20 would drag on the ground, get caught on trees and the like. Coupling lifting drone 14 to tether line 20 intermediate control station 12 and firefighting drone 16 allows tether line 20 to be supported above ground level and above obstructions such as trees and the like. As an example, lifting drone 14 can be positioned at 425 feet in height, providing ample distance between tether line 20 and obstructions.

Figure 2:
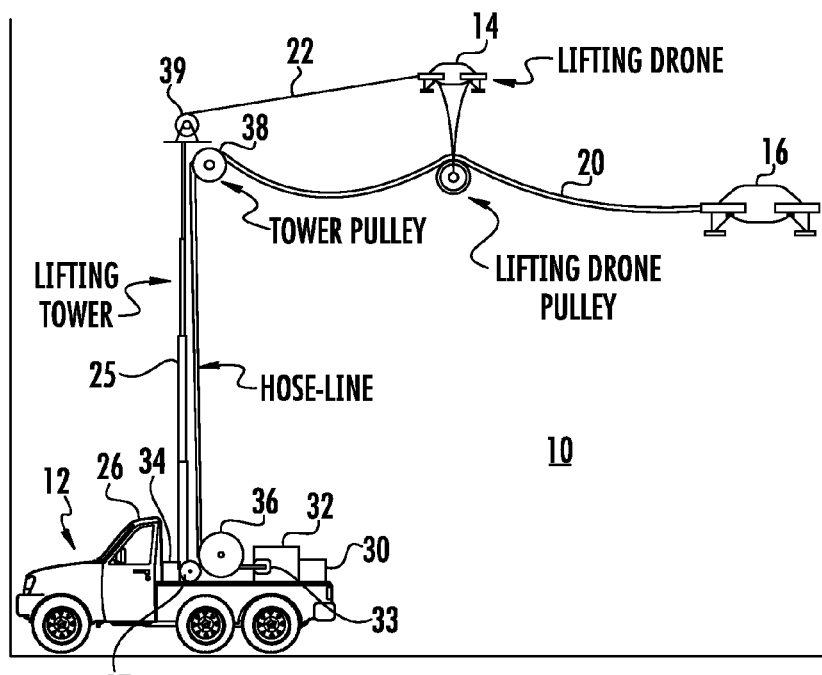
FIG. 2 is a side view of the system of FIG. 1 further illustrating the lifting tower.

Still referring to FIG. 1, with additional reference to FIG. 2, to further facilitate unobstructed operation of firefighting drone 16, system 10 can further include a lifting tower 25 positioned at or near control station 12. Lifting tower 25 can be an erectable tower, raised by a scissor mechanism, a folding mechanism, a telescoping mechanism or the like. Tower 25 can be movable between a retracted position to facilitate storage and an extended position in which an upper end can be raised upwardly to support tether line 20 an initial distance, for example 125 feet, above the ground and above any obstructions such as trees. With lifting tower 25 and at least one lifting drone 14, tether line 20 can be supported above obstructions closely adjacent control station 12.

Still referring to FIG. 2, in the preferred embodiment, control station 12 includes a vehicle 26 carrying tower 25, a power source 30 such as a battery array, a generator or the like, a tank 32 containing the fire fighting liquid, such as water, water with chemical fire retardant, slurry or the like, a pump 33 couple to tank 32 to pump the fluid, and a control unit 34 for controlling the operation of lifting drone 14 and firefighting drone 16. It will be understood that the drones 14 and 16 can be controlled over a control wire carried by power line 22 and/or tether line 20, or, as preferred, by remote control units well known in the art. In the preferred embodiment, drone 14 and 16 are remotely controlled by an Oculus Rift type virtual reality system with 360 degree view cameras carried by the drones. Tether line 20 and power line 22 are used to provide endless power from power source 30 to drones 14 and 16, allowing them to stay airborne for extended, if not unlimited periods of time. Electrical power is the preferred power source, but it will be understood that chemical power, such as gasoline can be employed. In this case, the power lines described would be a conduit for supplying gasoline to the drones.

Tower 25 is mounted on vehicle 26 with tether line 20 carried on a spindle 36 mounted on vehicle 26. Tether line can be unrolled from spindle 36 as needed, and is supported at the top end of tower 25 by a tower pulley 38. Tether line 20 continues from pulley 38 to lifting drone 14 and terminates at firefighting drone 16. As firefighting drone 16 is moved outwardly from control station 12, tether line 20 is deployed from spindle 36, and movably supported by pulley 38 and lifting drone 14. An additional pulley 39 is mounted on the upper end of tower 25 to movably support power line 22 for supplying power to Lifting drone 14. Power line 22 is carried by another spool 37 on vehicle 26 and coupled to power supply 30.

Figure 3:
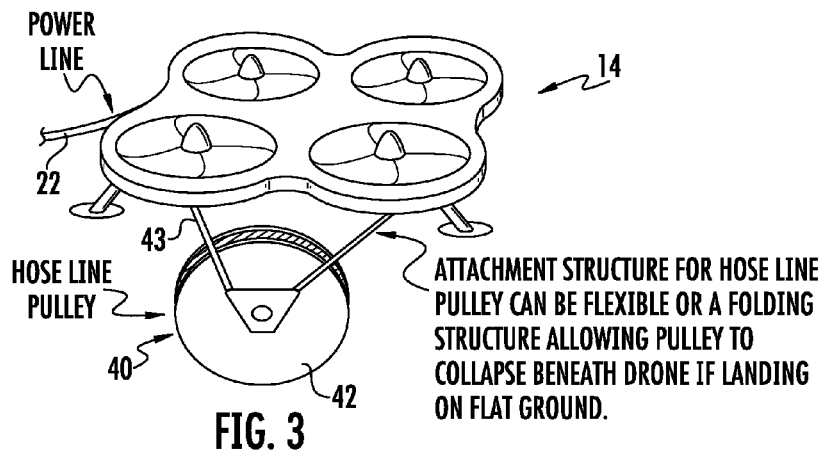
FIG. 3 is a perspective view of a lifting drone used in the firefighting system of the present invention.

Turning now to FIG. 3, lifting drone 14 is illustrated. Lifting drone 14 is preferably a quad-copter UAV, but it will be understood that substantially any UAV (drone) with vertical takeoff and landing capability can be employed. As an example, lifting drone 14 is approximately 12 feet in length, has a payload lifting capacity of 1000 lbs, and is remotely piloted through a Virtual Reality (VR) system. Lifting drone 14 includes drive motors, which in this embodiment are four electric motors driving rotors 41. Power line 22 is coupled to the drive motors to provide substantially unlimited flight time. Lifting drone 14 will not be described in detail as UAVs are well known in the art. This is a conventional UAV modified to include a tether line support assembly 40. In its simplest form, tether line support assembly 40 includes a pulley 42 supported below lifting drone 14 by a bracket 43. Bracket can be foldable or collapsible to permit landing of lifting drone 14. Tether line 20 is positioned over pulley 42, and is thereby supported by lifting drone 14 while permitting lifting drone 14 to move along tether line 20 intermediate tower 25 and firefighting drone 16.

Figure 4:
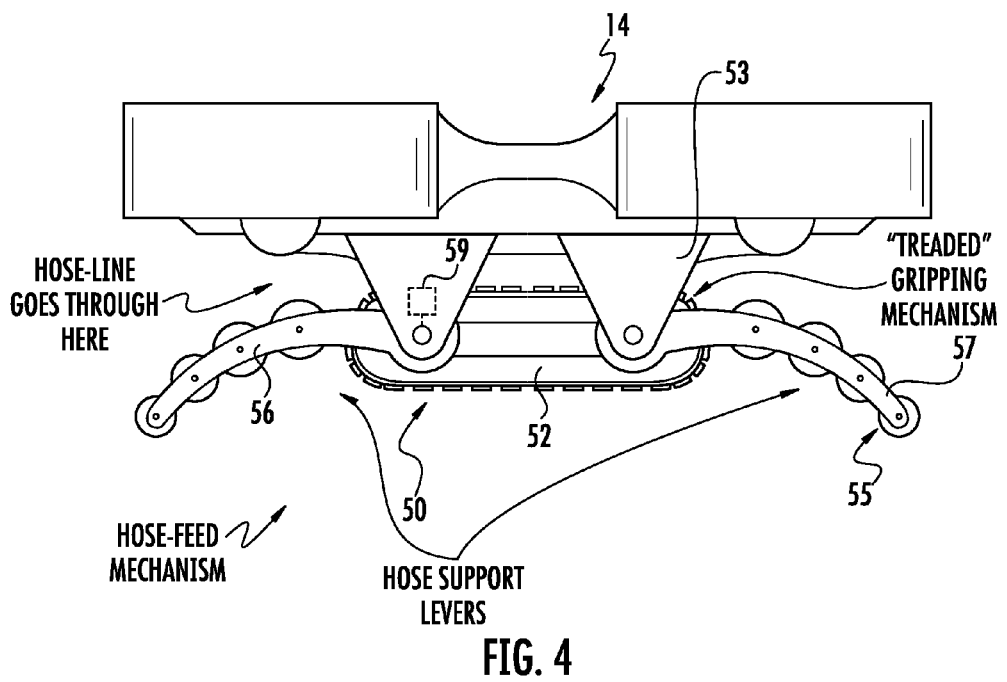
FIG. 4 is a side view of a lifting drone illustrating another embodiment of a tether line support assembly.

Referring now to FIG. 4, another embodiment of lifting drone 14 is illustrated. In this embodiment, lifting drone 14 is a conventional UAV modified to include a tether line support assembly 50. Tether line support assembly 50 includes a gripping mechanism 52 suspended below lifting drone 14 by brackets 53. Gripping mechanism 52 is slip resistant, treaded or similarly treated to provide a high friction surface allowing tether 20 to be supported while increasing the friction at the interface between tether 20 and gripping mechanism 52 to reduce slippage. Gripping mechanism 52 is similar to a small conveyor belt, and can be locked in a holding position for stationary positioning along tether line 20 or released to rotate in a direction desired to move lifting drone 14 along the length of tether line 20. Gripping mechanism 52 can be driven, or simply allowed to rotate as drone 14 is repositioned. A tether line weight distribution feedback system 55 is carried by lifting drone 14 and includes support levers 56 and 57 extend from opposing ends of gripping mechanism 52. Support levers 56 and 57 are spring loaded and biased to a substantially horizontal position as illustrated. Levers 56 and 57 are flexed to an increasingly lowered position by an increasing weight of tether 20 running thereover. Sensors 59 provide continuous feedback on the balance between levers 56 and 57, indicating when the weight is disproportionately to one side or the other of lifting drone 14. When an unacceptable imbalance is detected, drone 14 can be repositioned along the length of tether 20 to more effectively support it and balance the weight. This is accomplished by rotating gripping mechanism to drive the tether in the desired direction or unlocking the gripping mechanism to allow it to rotate as lifting drone 14 is moved along tether 20.

Figure 5:
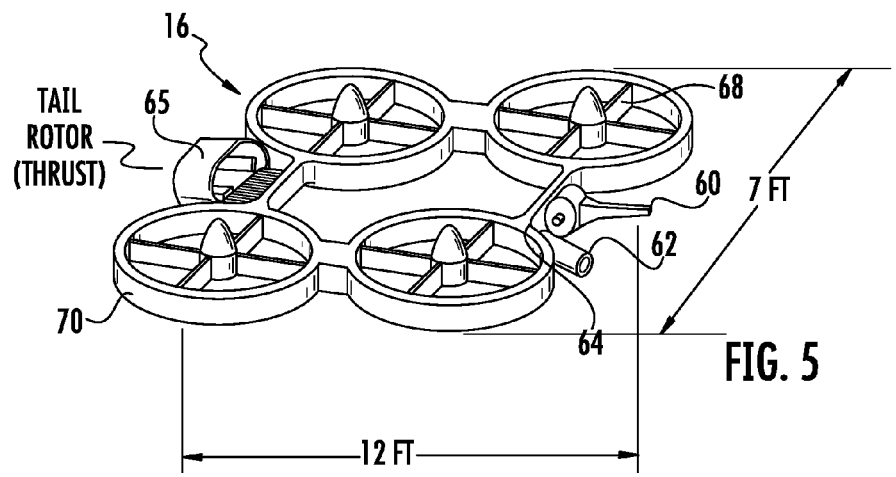
FIG. 5 is a perspective view of a firefighting drone used in the firefighting system of the present invention.
Figure 6:
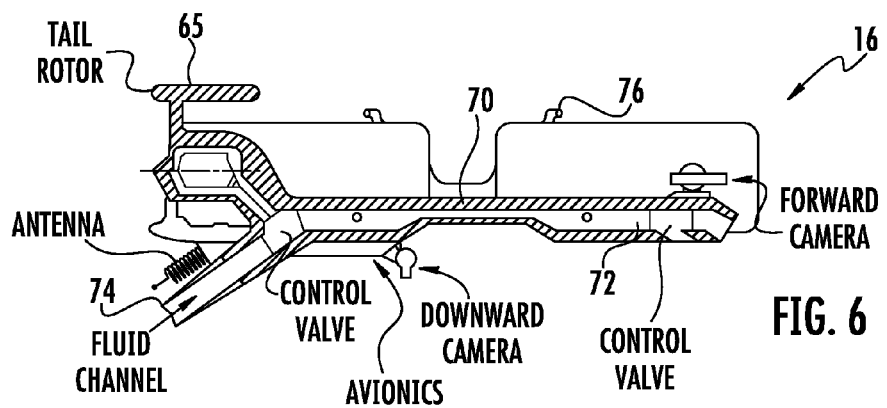
FIG. 6 is a sectional side view of the firefighting drone of FIG. 3.
Figure 10:
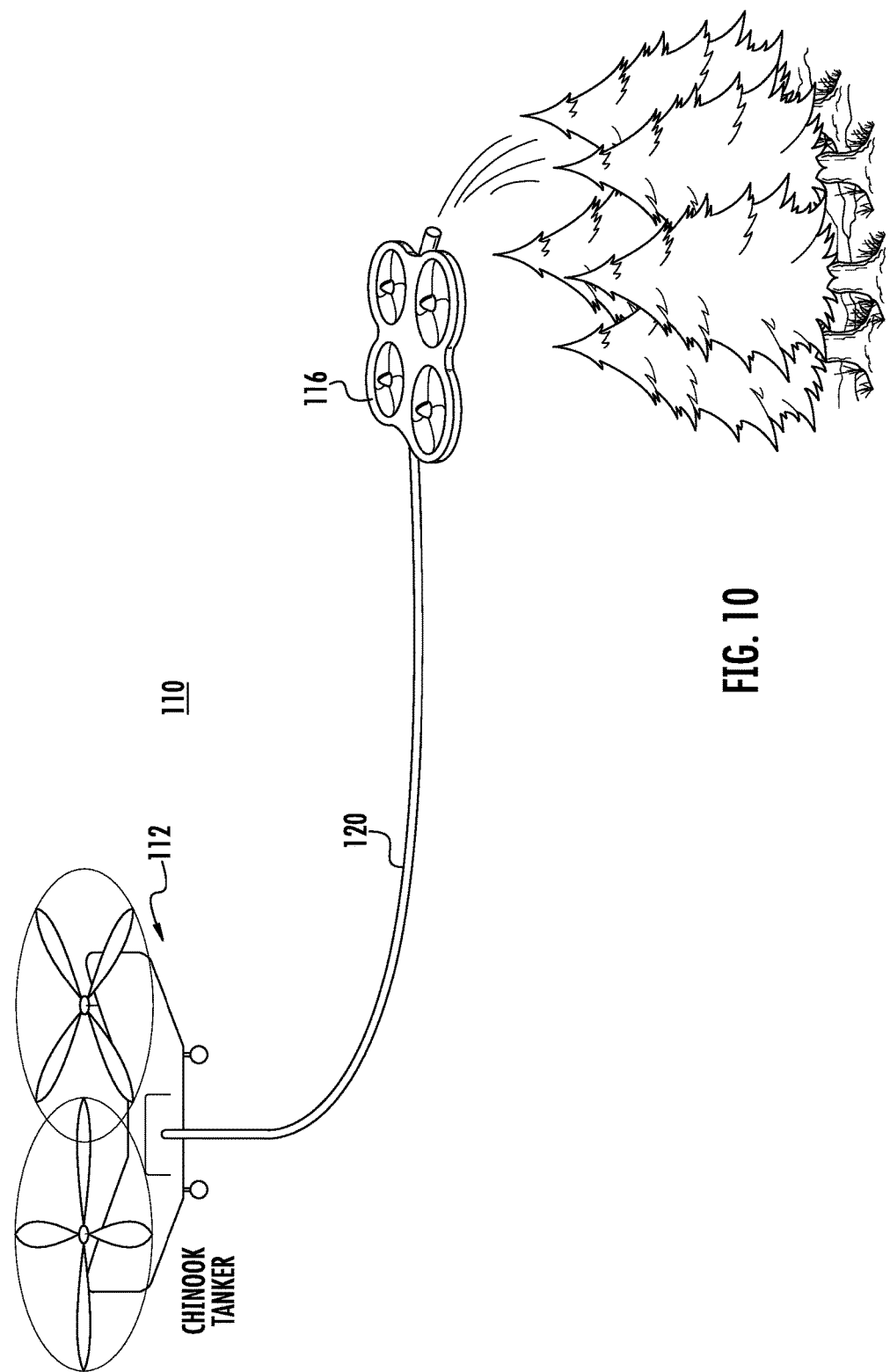
FIG. 10 is a diagram of a fully airborne system according to the present invention.

Turning now to FIGS. 5 and 6, firefighting drone 16 is illustrated. Firefighting drone 16 is preferably a quad-copter UAV, but it will be understood that substantially any UAV (drone) with vertical takeoff and landing capability can be employed. Firefighting drone 16 includes drive motors, which in this embodiment are four electric motors driving rotors 68. A power line carried within tether 20 is coupled to the drive motors to provide substantially unlimited flight time. Firefighting drone 16 is a conventional UAV modified to include various features as will be described. A high pressure spraying nozzle 60 and a low pressure soaker nozzle 62 are located on the front of drone 16. A hose, carried by tether 20 is coupled to nozzles 60 and 62 through a selection valve 64 and pump 33 to provide high pressure fluid from tank 32. While it will be understood that one or the other of nozzles 60 and can be provided by itself, the use of two selectable nozzles gives firefighting drone 16 the capability to spray an active fire at a distance, or to soak an area to prevent the fire from advancing. A tail rotor 65 has been added to the quad arrangement to provide an increased thrust capability to overcome the weight of tether line 20 when fully extended. In a preferred embodiment, firefighting drone 16 includes four lift rotors 68 with a total power of 322 horsepower. This gives the firefighting drone a total lifting capability of approximately 1,000 lbs. The rotors are enclosed within a surrounding frame 70 to prevent tether line 20 or any other objects from hitting rotors 68 and also for the safety of operating personnel during takeoffs and landing.

Referring now to FIG. 6, firefighting drone 16 can include an internal cooling system formed by a plurality of channels 72 formed in frame 70. An inlet 74 receives the end of a hose carried by tether 20 to supply water to the cooling system and to nozzles 60 and 62. The fire retardant, which can be water, water mixed with chemical retardant, or other fire retardant fluids, is passed through channels 72 to cool firefighting drone 16. Spray nozzles 76 coupled to channels 72 can be mounted at various positions on firefighting drone 16 to provide a cooling spray thereto. In this manner, firefighting drone 16 can be employed in a high temperature environment not accessible to a conventional drone. Passive thermal control components such as thermostats may be utilized to passively control the cooling system through a control valve 80 carried adjacent inlet 74 and controlling the flow of fluid within channels 72.

As has been briefly described throughout the description, tether line 20 includes various elements as illustrated in FIGS. 7 and 8. Tether line 20 includes a bundling sleeve 82 to maintain the various elements in a single line. Bundling sleeve 82 is preferably a semi-corrugated aluminized Mylar material to provide strength, light weight and heat protection characteristics. Tether line 20 includes a tension line 84 to provide tensile strength to tether 20, around which is bundled a fire retardant carrying hose 86 a power line 87 a control line and a water line to be mixed with the fire retardant chemical if not pre-mixed.

An example of a deployment strategy is illustrated with reference to FIG. 9. In this example, fire fighting system 10 can be used in combination with a slurry bomber. Three systems 10 would be used within an airborne protection area 90. The tethered systems 10 would be used to prevent spotting and lay down a layer of chemical retardant in protected area 90 in front of the advancing fire. A slurry bomber can still be used to suppress the active blaze while the tether systems 10 prevent spotting and prevent the blaze from advancing. Since the drones can be employed low over the tops of the trees, they will not interfere with the flight path of the slurry bomber.

In another embodiment of a tethered unmanned aerial vehicle firefighting system generally designated 110, a control station and lifting drone are combined into a tanker helicopter 112. In this case, only a tether line 120 and a firefighting drone 116 are employed. Since the control station and lifting drone are replaced with an aerial platform, tanker helicopter 112, a lifting tower is unnecessary. Tanker helicopter controls and supplies power and fire retardant to firefighter drone 116, which operates as previously described.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A tethered unmanned aerial vehicle firefighting system comprising:
    a firefighting drone having at least one drive motor and a nozzle;
    a control station including a control unit for controlling the firefighting drone, a fire retardant supply, a pump coupled to the fire retardant supply and a power supply;
    a tether line coupled between the control station and the firefighting drone, the tether line including a power line coupling the power source to and powering the at least one drive motor of the firefighting drone, and a fire retardant hose coupled between the pump and the nozzle for supplying fire retardant to the nozzle carried by the firefighting drone under pressure;
    a lifting drone engaging the tether line intermediate the control station and the firefighting drone to support the tether line above ground level and above obstructions, the lifting drone comprising:
        an unmanned aerial vehicle (UAV) with vertical takeoff and landing capability having at least one drive motor;
        a tether line support assembly coupled to the bottom of the UAV, the tether line support assembly includes a rotatable gripping mechanism suspended below the UAV and movable between a non-rotating configuration and a rotating configuration, wherein the tether line support assembly is substantially stationary relative the tether line in the non-rotating configuration and is movable along the tether line in the rotating configuration; and
        a tether line weight distribution feedback system including:
            support levers extending from opposing ends of the gripping mechanism, the support levers are spring loaded and biased to a substantially horizontal position and flex against the bias to an increasingly lowered position by an increasing weight of the tether line running thereover; and
            sensors coupled to the levers to provide feedback on the balance between levers, indicating when the weight of the tether line is disproportionately to one side or the other of the lifting drone.

2. A tethered unmanned aerial vehicle firefighting system as claimed in claim 1 wherein the control station is carried by a tanker helicopter.

3. A tethered unmanned aerial vehicle firefighting system as claimed in claim 1 wherein the gripping mechanism is a conveyor belt and can be driven in a selected direction to move the lifting drone along the length of the tether line, in the rotating configuration.

4. A tethered unmanned aerial vehicle firefighting system as claimed in claim 1 wherein the system further comprises a power line coupling the power source to and powering the at least one drive motor of the lifting drone.

5. A tethered unmanned aerial vehicle firefighting system as claimed in claim 1 wherein the firefighter drone further includes a tail rotor to provide an increased thrust capability to overcome the weight of the tether line.

6. A tethered unmanned aerial vehicle firefighting system as claimed in claim 1 wherein the firefighter drone further includes an internal cooling system formed by a plurality of channels formed in a frame thereof coupled between the fire retardant hose and the nozzle.

7. A tethered unmanned aerial vehicle firefighting system as claimed in claim 1 further including a lifting tower positioned at or near the control station to support the tether line above obstructions proximate the control station.

8. A tethered unmanned aerial vehicle firefighting system as claimed in claim 7 wherein the lifting tower is an erectable tower, movable between a retracted position to facilitate storage and an extended position in which an upper end can be raised upwardly to support the tether line an initial distance above ground level.

9. A tethered unmanned aerial vehicle firefighting system comprising:
    a firefighting drone having at least one drive motor and a nozzle;

a control station including a control unit for controlling the firefighting drone and a lifting drone, a fire retardant supply, a pump coupled to the fire retardant supply, and a power supply;

a tether line coupled between the control station and the firefighting drone, the tether line including a power line coupling the power source to and powering the at least one drive motor of the firefighting drone, and a fire retardant hose coupled between the pump and the nozzle for supplying fire retardant to the nozzle carried by the firefighting drone under pressure;

the lift drone having at least one drive motor and a tether line support assembly, the tether line support assembly movably engaging the tether line intermediate the control station and the firefighting drone to support the tether line above ground level and above obstructions, the tether line support assembly includes a rotatable gripping mechanism suspended below the lifting drone and movable between a non-rotating configuration and a rotating configuration, wherein the tether line support assembly is substantially stationary relative the tether line in the non-rotating configuration and is movable along the tether line in the rotating configuration, and a tether line weight distribution feedback system including:

support levers extending from opposing ends of the gripping mechanism, the support levers are spring loaded and biased to a substantially horizontal position and flex against the bias to an increasingly lowered position by an increasing weight of the tether line running thereover; and sensors coupled to the levers to provide feedback on the balance between levers, indicating when the weight of the tether line is disproportionately to one side or the other of the lifting drone; and a power line coupling the power source to and powering the at least one drive motor of the lifting drone.

10. A tethered unmanned aerial vehicle firefighting system as claimed in claim 9 further including a lifting tower positioned at or near the control station to support the tether line above obstructions proximate the control station.

11. A tethered unmanned aerial vehicle firefighting system as claimed in claim 10 wherein the lifting tower is an erectable tower, movable between a retracted position to facilitate storage and an extended position in which an upper end can be raised upwardly to support the tether line an initial distance above ground level.

12. A tethered unmanned aerial vehicle firefighting system as claimed in claim 9 wherein the gripping mechanism is a conveyor belt and can be driven in a selected direction to move the lifting drone along the length of the tether line, in the rotating configuration.

13. A tethered unmanned aerial vehicle firefighting system as claimed in claim 9 wherein the firefighter drone further includes a tail rotor to provide an increased thrust capability to overcome the weight of the tether line.

14. A tethered unmanned aerial vehicle firefighting system as claimed in claim 9 wherein the firefighter drone further includes an internal cooling system formed by a plurality of channels formed in a frame thereof coupled between the fire retardant hose and the nozzle.

* * * * *